United States Patent Office 3,752,821
Patented Aug. 14, 1973

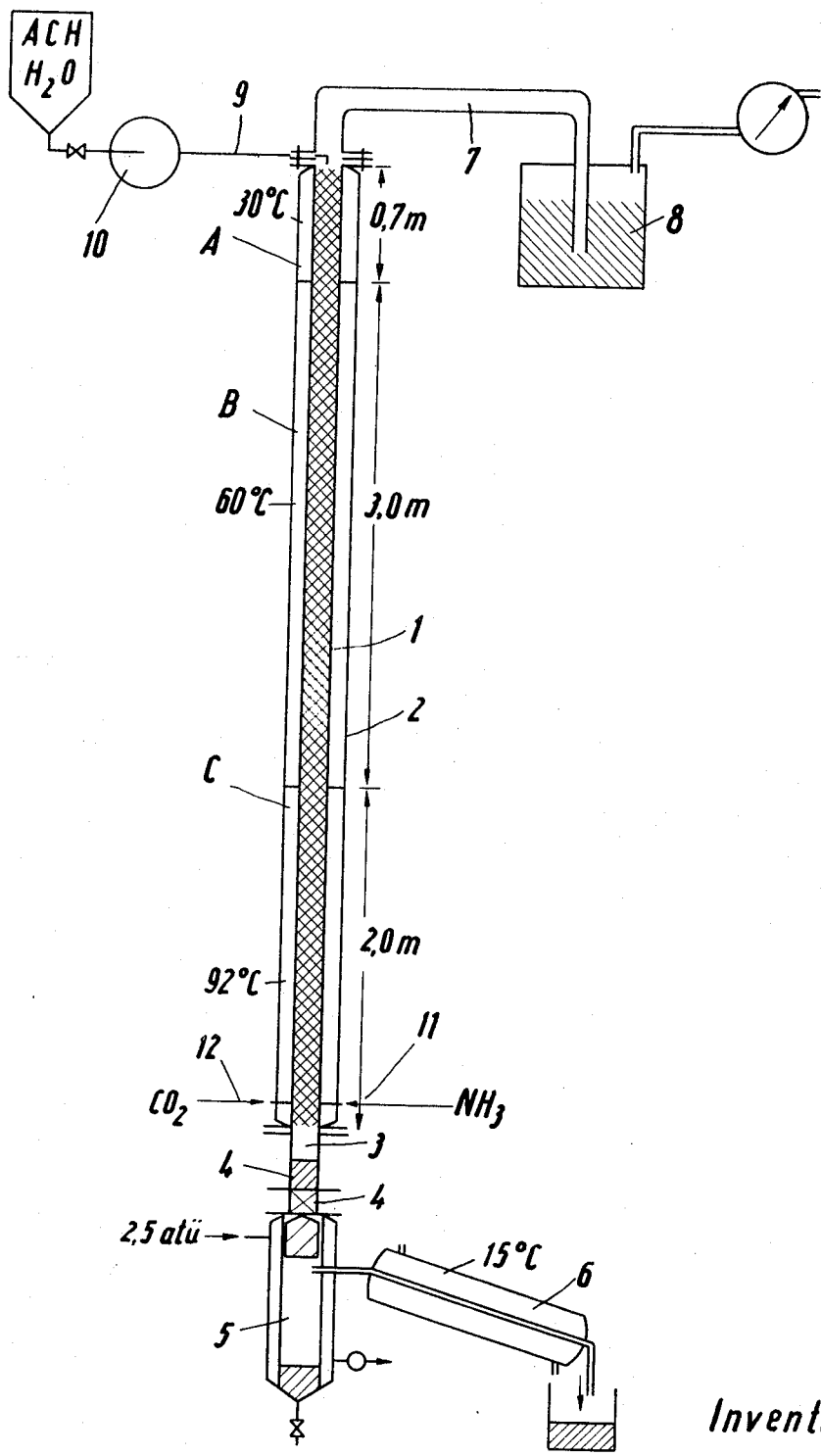

3,752,821
METHOD FOR THE CONTINUOUS MANUFACTURE OF HYDANTOINS, ESPECIALLY 5,5-DIMETHYLHYDANTOIN
Johannes Wollner, Kapellen, Kreis Moers, Peter Francis Pascoe, Moers, and Hans Arendsen, Homberg (Lower Rhine), Germany, assignors to Rheinpreussen AG, Homberg, Germany
Continuation of abandoned application Ser. No. 752,643, Aug. 14, 1968. This application June 1, 1971, Ser. No. 149,069
Claims priority, application Germany, Aug. 18, 1967, P 16 95 646.0
Int. Cl. C07d 49/32
U.S. Cl. 260—309.5       4 Claims

ABSTRACT OF THE DISCLOSURE

Improved process for continuously manufacturing hydantoins by the reaction of aldehydes or ketones with hydrocyanic acid or cyanides with ammonia or ammonium compounds and carbon dioxide or bicarbonates wherein the reaction is carried out countercurrently in a packed column.

---

This application is a continuation of application Ser. No. 752,643, filed Aug. 14, 1968 and now abandoned.

This invention relates to the production of hydantoins. It more particularly refers to such production carried out continuously.

It is known to prepare hydantoin compounds by the cyclization reaction, as it was called by Bucherer and Bergs. According to the description given, for example, in "Reaktionen der organischen Chemie" by H. Krauch and W. Kunz, 4th Ed. (1966), p. 108, ammonia or an ammonium compound is reacted either with carbonyl compound (ketone or aldehyde) and hydrocyanic acid or cyanide, or directly with a cyanohydrin.

A number of variations of this reaction are known, which relate to the selection of the starting materials, their proportions, and the conditions to be maintained in the process. According to the method described in Organic Syntheses, Coll. Vol. 3, p. 223, acetone cyanohydrin is reacted with $(NH_4)HCO_3$ at atmospheric pressure, in batches, resulting in the production of about 75 to 80% of the theory of 5,5-dimethylhydantoin. This product, however, is rather impure and, depending on the application, may have to be recrystallized several times.

Batch processes are also known in which elevated pressure is used. All these batch processes required a more or less great excess of one of the reactants if good yields are to be achieved. As a result of back-mixing and the relatively long residence time of the reactive carbonyl compounds in the reaction zone, secondary reactions often occur which give the products an undesired color and impair their futher processing.

It is for this reason that there has been a shift to the continuous performance of the reaction. According to the method described in German Pat. 1166201, either a carbonyl compound and hydrocyanic acid or a cyanohydrin is reacted with carbon dioxide and excess aqueous ammonia in a circulatory apparatus, and reaction solution is constantly taken from this circulation. The oily or crystalline hydantoins are separated from the taped-off reaction solution, and the mother liquor that remains can be fed back into the circuit after a relatively difficult processing.

As is evident from the use of a circulatory system, the transformation of the cyanohydrin in each cycle is not complete, even though excess ammonia is used. The incomplete reaction of the cyanohydrin, however, results in excessively long residence times, with the abovementioned danger of undesired side reactions.

It is therefore an object of this invention to provide a novel method of making hydantoins.

It is another object of this invention to provide a novel apparatus in which to carry out the novel process.

It is a further object of this invention to provide an improved process for the continuous production of hydantoins.

Other and additional objects of this invention will become apparent from a consideration of this entire specification including the claims and drawing.

In accord with and fulfilling these objects, one aspect of this invention includes the process of continuously making hydantoins, especially of 5,5-dimethylhydantoin, by the reaction of either carbonyl compounds and hydrocyanic acid or cyanides, or of cyanohydrins, with ammonia or ammonium compounds and carbon dioxide or bi-carbonates, in the presence of water or other solvents. The improvement resides in the fact of carrying out the reaction in a packed sprinkling tower, which is best arranged vertically, preferably according to the counter-current principle, by the introducing $NH_3$ and $CO_2$ in gas form into the bottom of the sprinkling tower and feeding the rest of the reactants downward from the top.

Accordinng to a further proposal of the invention, the sprinkling tower is preferably so that the temperature increases from the top toward the bottom.

It has developed surprisingly that, by the performance of the Bucherer reaction according to this invention, it is possible to achieve a practically complete reaction of the carbonyl or cyanohydrin compound, as the case may be, in a single downward passage through the tower, and neither the operation of a circulatory system nor operation under greatly elevated pressure or with a substantial excess of one of the reactants is necessary.

Understanding of this invention will be aided by reference to the accompanying drawing which is a vertical schematic view of the apparatus of this invention. This drawing and examples of this invention will be hereinafter explained in detail. It should be understood that the examples are illustrative and in no way limiting on this invention.

EXAMPLE 1

A sprinkling tower 1 made of V4A steel and having an inside diameter of 32 mm. and a useful length of about 5.70 m. is filled with porcelain Raschig rings of about 8 mm. diameter and set up vertically.

The sprinkler tower is provided with a heating jacket 2 which is divided into three heat zones: zone A has a length of 0.7 m. and a temperature of 30° C. The next lower zone is zone B which is 3 meters of length, and is maintained at 60° C. The bottom zone is 2 m. long and is heated to 92° C. The heating is done with hot water circulating with a thermostat control.

At the bottom of zone C of the sprinkler tower reactor is a viewing glass 3, a stop cock 4 and a thin layer evaporator 5 which is connected by a vapor tube to a condenser 6. The column 1 is connected at the head by a conduit 7 to a water-filled absorption vessel 8 in which the escaping gases are captured for re-use.

The thin layer evaporator 5 consists of a V4A steel tube of 60 cm. length and 50 mm. diameter and is heated by steam at 2 atmospheres gauge pressure.

An approximately 50% aqueous solution (by water) of acetone cyanhydrin is fed through line 9 to the head of column 1 by a metering pump 10, at a rate of 208 g. per liter of reactor volume per hour.

$NH_3$ and $CO_2$ are pumped in at the bottom end of tower zone C, at a rate of about 1.1 mole per mole of cyanohydrin, that is, 60 g. (33 l.) of $CO_2$ and 23.4 g. (33 l.) of $NH_3$ per liter of column volume per hour.

After an initiating period of about 90 minutes, the tower is in equilibrium.

About 5.3 g. (2.9 l.) of $CO_2$ and 2.05 g. (2.9 l.) of $NH_3$ escape at the head of the column.

134 grams per liter of column volume per hour of 5,5-dimethylhydantoin (DMH) with a melting point of 174° C. rapidly crystallize out of the reaction mixture leaving the evaporator 5, amounting to about 85% of the theory. Purification of this product is not necessary for most further working processes.

As it appeared from a titration of the mother liquor with $AgNO_3$ solution and KI as indicator, the cyanide content was extremely low and corresponded to a cyanohydrin conversion of more than 99% of the theory.

EXAMPLE 2

A repetition of Example 1 with changing concentrations of the acetone cyanohydrin (ACH) produced the following results:

| ACH concentration in wt. percent | Yield of 5,5-DMH, percent of theory | Melting point of 5,5-DMH, ° C. | Color | Yield in g./l./h. | Water distilled [1] percent |
|---|---|---|---|---|---|
| 30 | 40 | 174 | Pure white | 68.0 | 46 |
| 40 | 65 | 174 | Light yellowish | 91.5 | 40 |
| 50 | 85 | 174 | Yellowish white | 113.5 | 33 |

[1] As percentage of the weight of the crystalline 5,5-DMH.

EXAMPLE 3

A repetition of the process of Example 1 using a 50 wt.-percent aqueous solution of methyl ethyl ketone cyanhydrin and diethyl ketone cyanhydrin produced the corresponding hydantoins in similar yields: 5-methyl-5-ethylhydantoin, M.P. 144–146° C., and 5,5-diethylhydantoin, M.P. 106° C.

The new process is not limited to the procedure explained in the examples, but can be modified in many different ways. For example, it can be adapted to the lower reactivity of ketones or cyanohydrines having a steric impediment by modifying the length of the sprinkling tower, the pressure prevailing therein, and the length of the individual heating zones as well as their temperature, and by adjusting them to the troughput of cyanohydrin. It is furthermore advantageous to arrange a number of such columnar reactors in clusters, so as to reduce the amount of space required and the cost of heating and control equipment. The process and apparatus according to the invention will be managed in most cases without difficulty in such a manner that the cyanohydrin or the carbonyl compound, as the case may be, is reacted practically completely after a single pass through the reactor, thereby minimizing back-mixing. The hydantoins according to the invention, which are valuable intermediates, for example, for the manufacture of plastics, are obtained in a satisfactory yield according to the proposal of the invention, and in such a good purity that they are usable without further purification. The new process is at the same time free of annoying by-products, because as a result of the almost stoichiometric ratio of the reactants, all of the substances that go into it are at least resuable. The mother liquor remaining after separation of the hydantoins can be again concentrated and/or cooled, whereby additional hydantoin fractions are obtained. It is also possible, and often desirable, to use the mother liquor for the preparation of fresh cyanhydrin solution. Since this may entail a certain impairment of the purity of the hydantoin, it may nevertheless also be recommendable to further process the mother liquor separation, e.g., by chlorination and the like, whereby the N-chlorine derivatives of the hydantoins are obtained.

What is claimed is:

1. In the process of producing a 5,5-disubstiuted hydantoin by the reaction of a liquid cyanohydrin selected from the group consisting of acetone cyanohydrin, methylethylketone cyanohydrin, diethylketone cyanohydrin with ammonia and carbon dioxide in the presence of a solvent; the improvement which comprises carrying out the reaction in a vertical zone, said zone containing inert packing material by feeding said cyanohydrin at the top thereof and causing the same to pass downwardly through said zone while introducing said ammonia and said carbon dioxide into the bottom of said zone and causing the same to flow upwardly therein while maintaining a temperature profile in said zone such that the temperature increases from the top to the bottom, recovering an effluent from the bottom of said zone and recovering the desired hydantoin product from said effluent.

2. The improved process claimed in claim 1, wherein said cyanohyldrin reactant is 30 to 50 weight percent aqueous solution of acetone cyanohydrin.

3. A process according to claim 1 wherein the hydantoin product is separated from the mother liqour by means of evaporation.

4. Improvement according to claim 1 wherein the cyanohydrin, ammonia and carbon dioxide are present in substantially stoichiometric amounts.

References Cited

UNITED STATES PATENTS

| 344,322 | 6/1886 | Lunge | 23—283 |
| 1,654,181 | 12/1927 | Mann | 23—283 |
| 2,451,433 | 10/1948 | Davis | 23—283 |
| 2,566,224 | 8/1951 | Mackay | 23—283 |
| 2,808,420 | 10/1957 | Humphlett | 23—283 |
| 3,199,959 | 8/1965 | Dempsey | 23—283 |
| 3,440,018 | 4/1969 | Eckert | 23—283 |

FOREIGN PATENTS

| 543,582 | 7/1957 | Canada | 260—309.5 |
| 936,664 | 9/1963 | Great Britain | 260—309.5 |

OTHER REFERENCES

Ware, Chem. Rev., Vol. 46, pp. 422–25 relied on (1950). QDI.A563.

NATALIE TROUSOF, Primary Examiner

U.S. Cl. X.R.

23—283 ated August 14, 1973

UNITED STATES PATENT OFFICE
CERTIFICATE OF CORRECTION

Patent No. 3,752,821    Dated August 14, 1973

Inventor(s) Johannes Wollner et al

It is certified that error appears in the above-identified patent and that said Letters Patent are hereby corrected as shown below:

Column 2, line 66

"water" should be "weight"

Column 3, line 45

"troughput" should be "throughput"

Column 3, line 54

After "hydantoins" insert -- obtainable --.

Signed and sealed this 1st day of October 1974.

(SEAL)
Attest:

McCOY M. GIBSON JR.
Attesting Officer

C. MARSHALL DANN
Commissioner of Patents